United States Patent
Deshpande

(10) Patent No.: US 8,805,337 B2
(45) Date of Patent: Aug. 12, 2014

(54) CONTEXT AWARE MESSAGE PRESENTATION SYSTEM

(75) Inventor: Pankaj Arvind Deshpande, San Diego, CA (US)

(73) Assignee: Omnitracs, LLC, San Diego, CA (US)

(*) Notice: Subject to any disclaimer, the term of this patent is extended or adjusted under 35 U.S.C. 154(b) by 1374 days.

(21) Appl. No.: 12/261,237

(22) Filed: Oct. 30, 2008

(65) Prior Publication Data

US 2009/0117881 A1 May 7, 2009

Related U.S. Application Data

(60) Provisional application No. 60/984,574, filed on Nov. 1, 2007.

(51) Int. Cl.
 *H04M 3/42* (2006.01)
 *H04W 80/12* (2009.01)
 *H04W 80/08* (2009.01)
 *H04W 80/10* (2009.01)
 *H04W 80/06* (2009.01)
 *H04W 4/18* (2009.01)

(52) U.S. Cl.
 CPC .............. *H04W 80/12* (2013.01); *H04W 80/08* (2013.01); *H04W 80/10* (2013.01); *H04W 80/06* (2013.01); *H04W 4/18* (2013.01)
 USPC .................. 455/414.1; 455/412.1; 455/412.2; 455/466; 370/464; 370/465; 370/466; 370/467; 709/206

(58) Field of Classification Search
 CPC ..... H04W 80/02; H04W 80/04; H04W 80/06; H04W 80/12; H04W 80/08; H04W 80/10; H04W 4/18; H04L 12/5825; H04L 12/583
 USPC .......... 455/456.3, 412.1–412.2, 414.1–414.4, 455/466, 456.1, 456.6; 370/464–467; 709/206
 See application file for complete search history.

(56) References Cited

U.S. PATENT DOCUMENTS

| 7,076,243 | B2* | 7/2006 | Parupudi et al. ........... 455/414.1 |
| 2002/0077086 | A1* | 6/2002 | Tuomela et al. .............. 455/414 |
| 2004/0081120 | A1 | 4/2004 | Chaskar |
| 2005/0003804 | A1* | 1/2005 | Huomo et al. ............. 455/414.1 |
| 2006/0089160 | A1 | 4/2006 | Othmer |
| 2010/0222080 | A1* | 9/2010 | Carreras et al. ........... 455/456.3 |

FOREIGN PATENT DOCUMENTS

EP 1217792 A 6/2002

OTHER PUBLICATIONS

International Search Report, PCT/US2008/081942 International Searching Authority—European Patent Office. Feb. 17, 2009.
Written Opinion of the International Searching Authority, PCT/US2008/081942. International Searching Authority—European Patent Office. Feb. 17, 2009.

* cited by examiner

*Primary Examiner* — Khalid Shaheed
(74) *Attorney, Agent, or Firm* — Arent Fox LLP

(57) ABSTRACT

The specification and drawing figures describe and show an apparatus, method, and system for presenting context aware messages. The system includes a mobile wireless communication. The mobile wireless communication instrument is operatively connected to a data processor. The data processor is adapted to receive, store, execute and compose information and data into a global message. At least one context management protocol is stored in the mobile wireless communication instruments. The context management protocol is adapted to accompany a global message and to selectively modify the global message into one or more context aware messages for receipt by any of the plurality of mobile wireless communication instruments.

39 Claims, 4 Drawing Sheets

CONTEXT AWARE MESSAGE PRESENTATION SYSTEM

CLAIM OF PRIORITY UNDER 35 U.S.C. §119

The present Application for Patent claims priority to Provisional Application No. 60/984,574 entitled "Context aware message presentation system" filed Nov. 1, 2007, which is assigned to the assignee hereof and are hereby expressly incorporated herein by reference.

FIELD OF TECHNOLOGY

The method, apparatus and system method disclosed, illustrated and claimed in this document pertains generally to applying a context management protocol, which includes one or more sets of rules, to messages. More particularly, the new and useful context aware message presentation system provides messages to users with a specific context desired by a message recipient.

BACKGROUND

Numerous examples in the field of communications arise in which the entity receiving and reading information displayed on the entity must interpret the information depending on the context in which it is being read. The term "entity" as used in this document means and includes at least a wireless mobile wireless communication instrument and/or wireless communication instrument. The context aware message presentation method, system, and apparatus disclosed, illustrated and claimed in this document is capable of exchanging information with one or more entities and with one or more groups of entities sharing common parameters in a way that presentation of the information is a function of the context of the entity at the time of presentation.

A non-exclusive example of context is location: a context aware message itself may include data and information about how a context aware message should be presented to the user of an entity, and a recipient of the messages on a wireless mobile wireless communication instrument, depending on the location where the context aware message is to be presented.

Other attempts to solve the problems solved by the method, system, and apparatus disclosed, illustrated and claimed in this document include a central managing entity, generally including one or more servers. The central managing entity monitors and keeps track of the context of each entity that is receiving and sending different messages to the central managing entity to match context. Use of a central managing entity substantially increases the complexity of design of a context-oriented system because the central managing entity must track each entity that the central managing entity is managing, and must format messages on a case-by-case basis. In addition, because each message sent and received may differ for each individual entity, the central managing entity is unable to use a general broadcast mechanism to send the messages. Accordingly, such a system will be unable to reduce messaging costs.

SUMMARY

The apparatus, system, method, and system disclosed, illustrated, and claimed in this document address the above-stated needs by providing a system for presenting context aware messages. The system includes a mobile wireless communication. The mobile wireless communication instrument is capable of receiving and transmitting information and data to a number of additional mobile wireless communication instruments. The mobile wireless communication instruments are operatively connectable to a data processor. The data processor is adapted to generate, receive, store, execute, process and compose information and data into a global message. The global message may be transmitted across a communication network to which the mobile wireless communication instruments are operatively connected. At least one context management protocol is stored in the mobile wireless communication instruments. The context management protocol is adapted to selectively modify the global message into one or more context aware messages for receipt by any of the plurality of mobile wireless communication instruments. The global message itself, however, includes a context management protocol that contains all rules necessary for enabling a message receiving entity to interpret the message based on the current context.

Thus, the context aware message presentation system of this document does not include the limitations of context messaging systems that rely on central managing entity. There is no need for a central managing entity. Alternatively, any central managing entity may be a simple broadcast system that is not required to monitor and keep track of the context of any entity; it may broadcast the same message to all the entities.

Accordingly, a context aware message includes a set of rules that defines how to interpret the same information in different ways depending on which rule or combination of rules is appropriate at the time the information is received and read by a user of an entity such as a wireless mobile wireless communication instrument. One non-exclusive example is a rule included in the context management protocol that determines how to interpret the information accompanying a message at various SPS position coordinates. Such a rule might provide, for example, that the information in a message is valid only if being received and interpreted within an area identified by certain GPS coordinates. Another example is a message with a time expiration that is valid only if received and interpreted within a certain time interval. Neither location, position, nor time, however, are limitations of the context aware message presentation system disclosed, illustrated and claimed in this document. Rather, a wide range of parameters and conditions may be applied to create a context aware message.

Contextual information may contain information and data to be presented to one or more users of entities. The contextual information also may include one or more first sets of rules (in this document, "context rules") that define a variety of contexts expressing when and how the data will be useful to the user of an entity. The contextual message also includes one or more second sets of rules for each context rule (in this document, "presentation rules") that assist in interpreting data within a given context. Non-exclusive examples of application of the context aware message presentation method, system, and apparatus disclosed, illustrated and claimed in this document is a 'To Do list' which might be contextually valid only if near defined locations; or a discount coupon negotiable only in certain stores; and/or a greeting message contextually valid on a certain date and at a certain location.

It will become apparent to one skilled in the art that the claimed subject matter as a whole, including the structure of the system, and the cooperation of the elements of the system, combine to result in a number of unexpected advantages and utilities. The structure and co-operation of structure of the context aware message presentation system will become apparent to those skilled in the art when read in conjunction with the following description, drawing figures, and appended claims.

The foregoing has outlined broadly the more important features of the context aware message presentation system to better understand the detailed description that follows, and to better understand the contributions to the art. The context aware message presentation system is not limited in application to the details provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based may be used as a basis for designing other structures, methods, and systems. The claims, therefore, include equivalent constructions. Further, the abstract associated with this disclosure is intended neither to define the context aware message presentation system, which is measured by the claims, nor intended to limit the scope of the claims. The novel features of the context aware message presentation system are best understood from the accompanying drawing, considered in connection with the accompanying description of the drawing, in which similar reference characters refer to similar parts, and in which:

Figure 1:
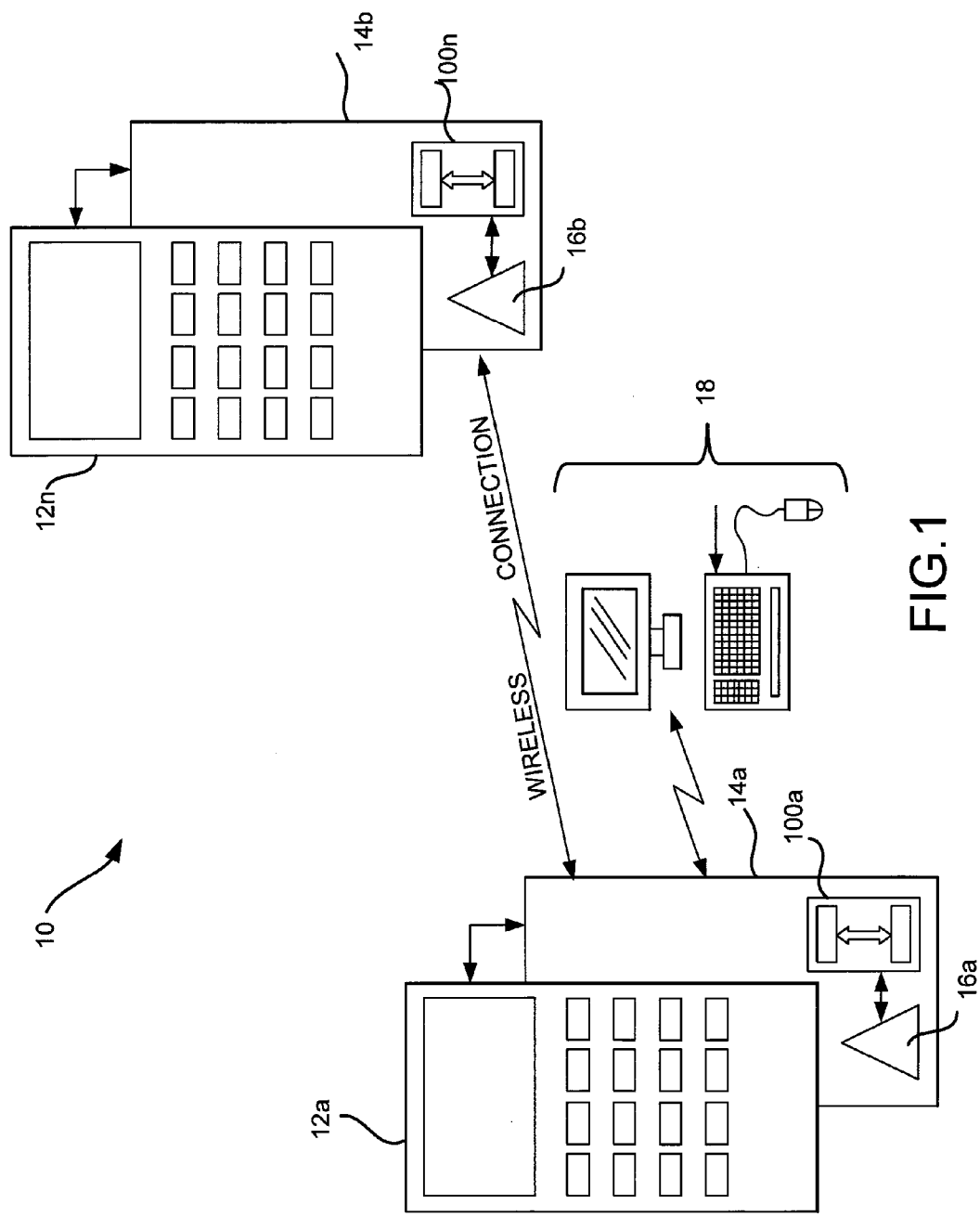
FIG. 1 of the drawing is a block diagram showing components of the context aware message presentation system disclosed, illustrated and claimed in this document.

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

DETAILED DESCRIPTION

Definitions

The term "context management protocol" means a set of rules and procedures for comparing, collating, and changing into a context aware message information and data included in a global message, as defined in this document. Presentation of the information is a function of the context of the person or entity receiving and/or reading the context aware message at the time of presentation. One non-exclusive example of context is location; the context management protocol will present information that is a function of the location of the person or entity. A context aware message may include related information based on shared context parameters that, in one aspect, are associated with one or more contextual communications groups. The context management protocol is capable of interpreting, classifying, and grouping information in a global message in a variety of ways to assemble and present a plurality of context aware messages deliverable to either a user of a mobile wireless communications instrument or wireless communications instrument, or to a contextual communication group. In one aspect of the context management protocol, the context aware message or context aware messages may vary as a function of the time when the context aware message is available for delivery and/or acceptance by a user and/or a contextual communication group. In another aspect, the context aware message or context aware messages may vary as a function of the location of the user and/or members of a contextual communication group. In yet another aspect, the context aware message or context aware messages may vary as a function of any number of conditions and/or rules included in the context management protocol. The context management protocol is included in the transmission of a global message. Either a user of an instrument, or one or more members of a contextual communication group who also are users of an instrument, may selectively modify a global message into a context-defined message for transmission to and among a contextual communication group.

The term "context aware message" means at least a message that has been modified to include both information, and the rules that define how to interpret the information, based on the context of the wireless communication instrument, as well as on selected shared context parameters of use or of interest to a recipient of the context aware message. Context aware messages may also include related information based on shared context parameters that, in one aspect, are associated with one or more contextual communications groups. Accordingly, the term "context" includes at least the environment in which information may be of use or interest to one or more users of a mobile wireless communications instrument or wireless communications instrument. Thus, a context aware message will include at least one set of rules that define how to interpret the same or similar information in different ways depending on, or as a function of, one or more context parameters. The context aware message also includes context aware information, at least one set of data that may change content or meaning depending on, or as a function of, the rules or context contained within the context aware information.

The term "contextual communication group" means a plurality of users of a plurality of mobile wireless communications instruments or wireless communications instruments who periodically accept receipt of one or more context aware messages. A member of a contextual communication group, alone or in combinations with another member of a contextual communication group, may change a context, context parameters, the contextual group, and/or the context aware message.

The term "shared context parameters" means at least a set or sets of data that include a family or collection of factors, one or more of which may be of use or interest to one or more users of, or one or more contextual communication groups associated with, a plurality of mobile wireless communications instruments or wireless communications instruments. The context management protocol is capable of changing the content and/or meaning of a context aware message to limit a transmission to such set or sets of data. Non-exclusive examples of such factors include temporal (or time-sensitive) factors; geographical or location factors; and frequency of acceptance of context aware messages that include including one or more such factors, among others.

As used in this document, the term "mobile wireless communication instrument" and/or "wireless communication instrument" means at least an entity, which may include a wireless communication instrument used in a wireless communications system that, in general, includes an array of operatively connected communication devices or entities adapted to receive and transmit at least electromagnetic signals without cables, using at least infrared light and radio signals, and also includes a telecommunications system in which electromagnetic waves, rather than some form of wire, carry the signal over all or part of the communication path. The mobile wireless communications instrument may also receive and transmit signals from satellites, including satellites that are part of the Global Positioning System ("GPS"), Galileo, GLONASS, NAVSTAR, GNSS, a system that uses satellites from a combination of these systems, or any Satellite Positioning System ("SPS") subsequently developed (collectively referred to generally in this document as a "Satellite Positioning System" ("SPS")). As used in this document, an SPS also includes pseudolite (pseudo-satellite) systems.

The term "instrument" in combination with the words "mobile wireless communications," means and includes at least a cellular phone and a pager, a satellite telephone, a two-way pager, a personal digital assistant ("PDA") having wireless capabilities, a portable data processor having wireless capabilities, home entertainment system control boxes, wireless local area networks, and any other type of wireless device having transmission capabilities that may also be one or more versions of a personal communications services device ("PCS") including time division multiple access ("TDMA"), a code division multiple access ("CDMA"), a global system for mobile ("GSM"), a universal mobile telecommunications system ("UMTS"), a wideband code division multiple access ("W-CDMA"), an evolution-data optimized ("EV-DO"), wireless local area network ("WLAN") devices, wireless personal area network ("WPAN") devices, non-voice communications apparatus, and text transmission apparatus, among others.

The word "exemplary" is used herein to mean "serving as an example, instance, or illustration." Any aspect described in this document as "exemplary" is not necessarily to be construed as preferred or advantageous over other aspects.

DESCRIPTION

As shown in FIGS. 1-4, a system for presenting context aware messages is illustrated that in its broadest context includes a mobile wireless communication instrument. The mobile wireless communication instrument is capable of receiving from and transmitting to other mobile wireless communication instruments a wide variety of information and data, including one or more global messages that may be converted to context aware messages. The mobile wireless communication instrument is operatively connectable to a data processor. The data processor is adapted to receive, store, execute, process and compose information and data into a global message. The global message may be transmitted across a communication network to which the mobile wireless communication instruments are operatively connected. At least one context management protocol is stored in the mobile wireless communication instruments, and all or selected portions of the content of the one or more context management protocols may be transmitted to and among the mobile wireless communication instruments together with one or more global messages. The context management protocol is adapted to selectively modify the global message into one or more context aware messages for receipt by any of the plurality of mobile wireless communication instruments.

More specifically, as illustrated by cross-reference between FIGS. 1-4, a system for presenting context aware messages 10 includes a mobile wireless communication instrument 12. As shown in FIG. 1, the mobile wireless communication instrument 12 is capable of receiving and transmitting information and data to a number of mobile wireless communication instruments 12a-n. The mobile wireless communication instruments are operatively connectable to a data processor 14a-n. The data processor 14a-n is adapted to generate, receive, store, execute, process and compose signals, information and data into a global message. The global message may be transmitted across a communication network diagrammatically labeled and illustrated as a "Wireless Connection" to which the mobile wireless communication instruments 12a-n operatively is connected. At least one context management protocol 16a-n, shown diagrammatically in FIG. 1, is stored in the mobile wireless communication instruments 12a-n. The context management protocol 16a-n is adapted to selectively modify the global message into one or more context aware messages for receipt by any of the plurality of mobile wireless communication instruments 12a-n. In yet another aspect of the system for presenting context aware messages 10, contextual information may be exchanged between two or more context aware devices, and includes managing techniques for contextual information. Thus, a general purpose computer system 18 may also be included.

Figure 2:
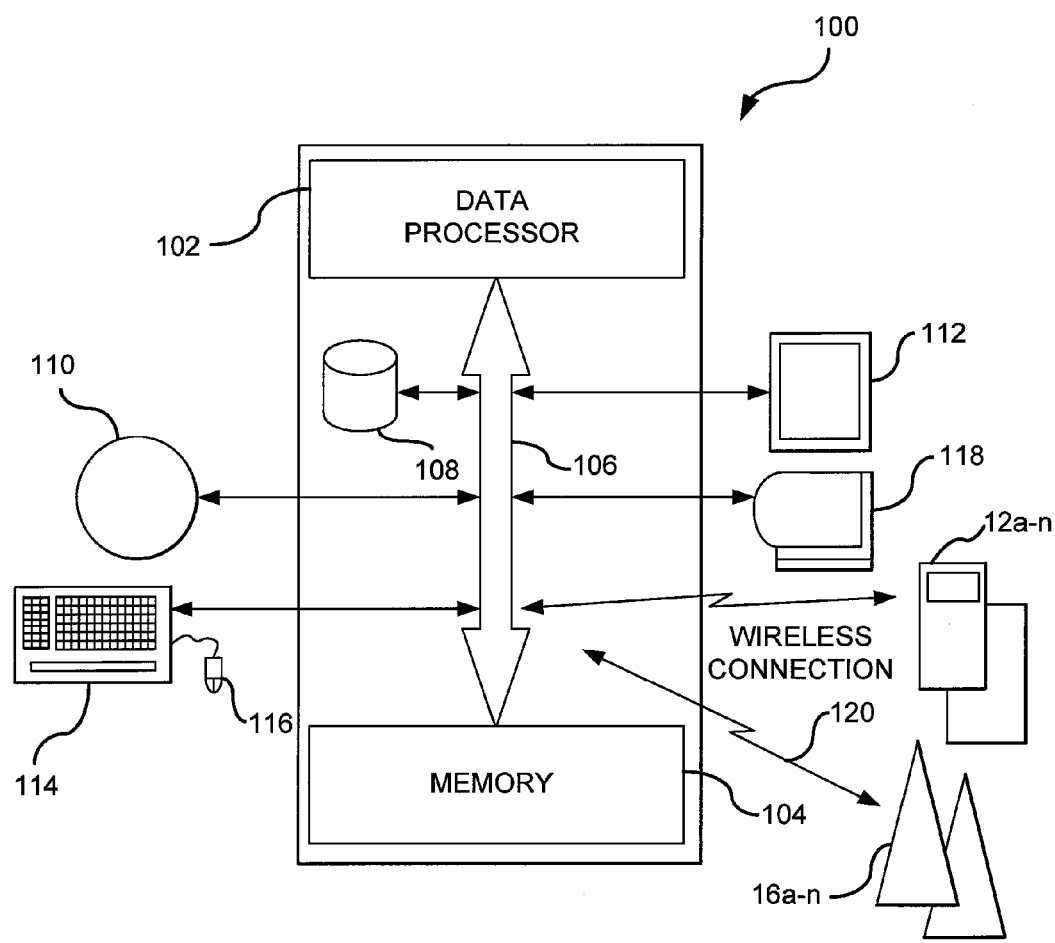
FIG. 2 is a block diagram showing schematically components of and components related to the computer and/or data processor included in the context aware message presentation system.

As illustrated in FIG. 2, the mobile communications instrument 12a-n illustrated in FIG. 1 is shown to include a data processing system 100 as illustrated in the non-exclusive example in the block diagram in FIG. 2. As illustrated, the data processing system 100 may include a variety of components to enable the mobile communications instrument 12a-n illustrated in FIG. 1 to send and receive data and information, including image identification and image authentication for use in the context aware message presentation system 10 also shown in FIG. 1. As a person of skill in the art will recognize, all information and data generated, stored, received, processed, and transmitted by the mobile communications instrument 12a-b may be received, processed, and transmitted as well to other devices that may be operatively connectable to one or more mobile communications instrument 12a-n.

Thus, as also illustrated if FIG. 2, the data processing system 100 includes a data processor 102 and memory 104. The data processor 102 is numbered differently than the data processor 14a-n for ease of reference in FIG. 2, but may be the same data processor 14a-n depending on the precise structure of the respective data processor 14a-n and/or 102, and depending on functional overlap. A bus 106 connects the data processor 102 and memory 104. Memory 104 is a relatively high-speed machine-readable medium and may include volatile memories such as DRAM, and SRAM, as well as non-volatile memories such as ROM, FLASH, EPROM, EEPROM, and bubble memory. Also connectable to the bus 106 are optional secondary storage 108, external storage 110, output devices such as a monitor 112 that may be operatively connected to the mobile wireless communications instrument 12a-n, and in optional configurations an input device such as a keyboard 114 with a mouse 116, and perhaps a printer 118. Secondary storage 108 may include machine-readable media such as a hard disk drive, a magnetic drum, and bubble memory. External storage 110 may include machine-readable media such as a floppy disk, a removable hard drive, a magnetic tape, CS-ROM and even other data processors, possibly connected via a communications line 120 to one or more non-mobile communications devices 16a-n as illustrated by cross-reference to FIG. 1.

A person of skill in the art will appreciate that there is substantial functional overlap between and among the components illustrated in FIG. 2. Data processor software and user programs can be stored in a software storage medium such as memory 104, secondary storage 108, and external storage 110. Executable versions of data processor software can be read from a storage medium such as non-volatile memory, loaded for execution directly into volatile memory, executed directly out of non-volatile memory, or stored in the secondary storage 108 prior to loading into volatile memory for execution.

In addition, those skilled in the art also will appreciate that the various illustrative logical blocks, modules, circuits, and algorithm steps described in this document may be implemented as electronic hardware, data processor software, or combination of both. To clearly illustrate this interchangeability of hardware and software, various illustrative and non-exclusive components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

Likewise, the various illustrative logical blocks, modules, and circuits described in connection with the system for medication management disclosed in this document may be implemented or performed with a general purpose data processor, a Digital Signal Processor ("DSP"), an Application Specific Integrated Circuit ("ASIC"), a Field Programmable Gate Array ("FPGA") or other programmable logic device, discrete gate or transistor logic, discrete hardware components, or any combination thereof, designed to perform the functions described in this document. A general-purpose processor may be a microprocessor, but in the alternative, the processor may be a conventional processor, controller, microcontroller, or state machine. A processor may also be implemented as a combination of computing devices such as, in a non-exclusive example, a combination of a DSP and a microprocessor, a plurality of microprocessors, one or more microprocessors in conjunction with a DSP core, or any other such configuration.

Those of skill in the art also would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 3:
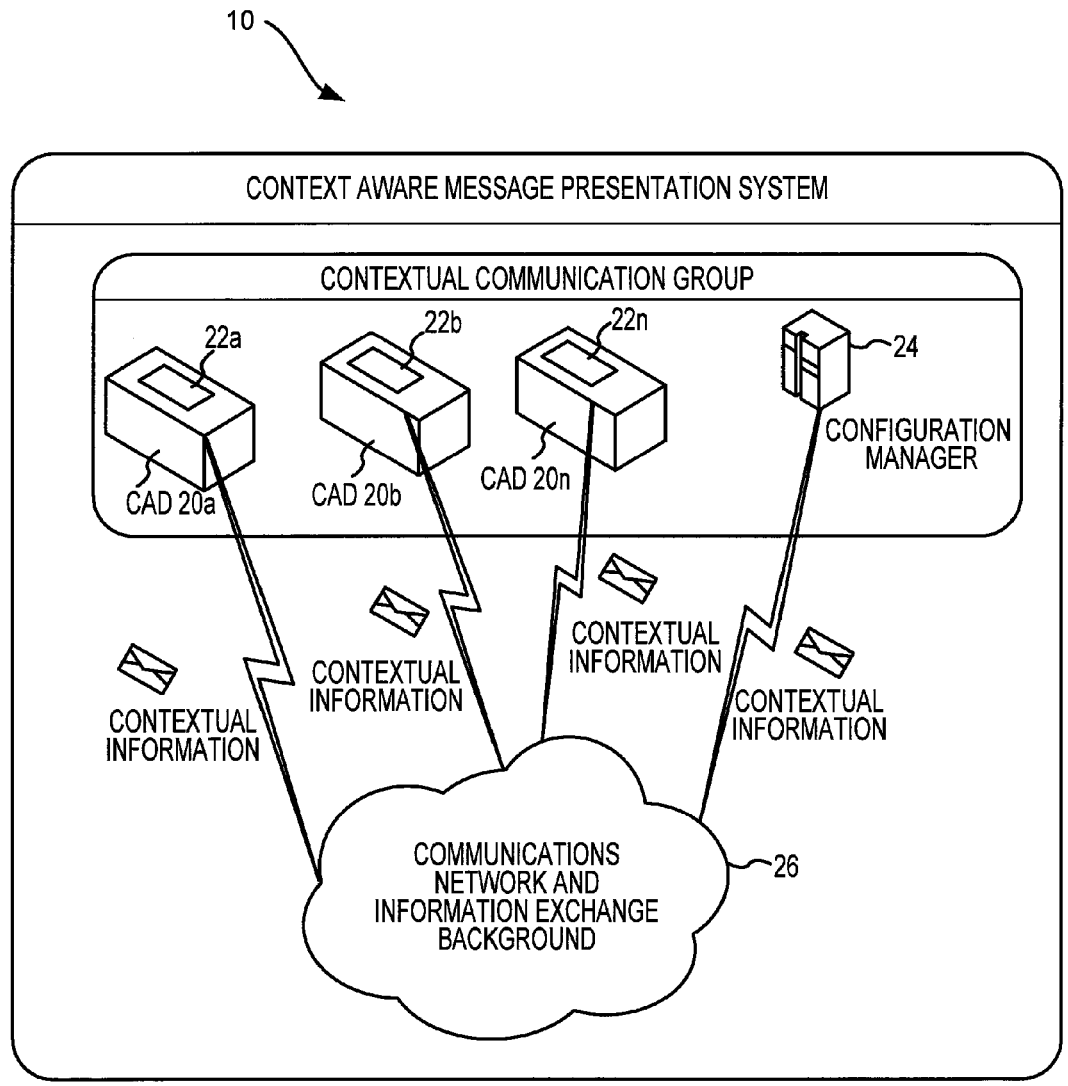
FIG. 3 is a diagrammatic representation of the context aware message presentation system in a contextual communications group configuration.
Figure 4:
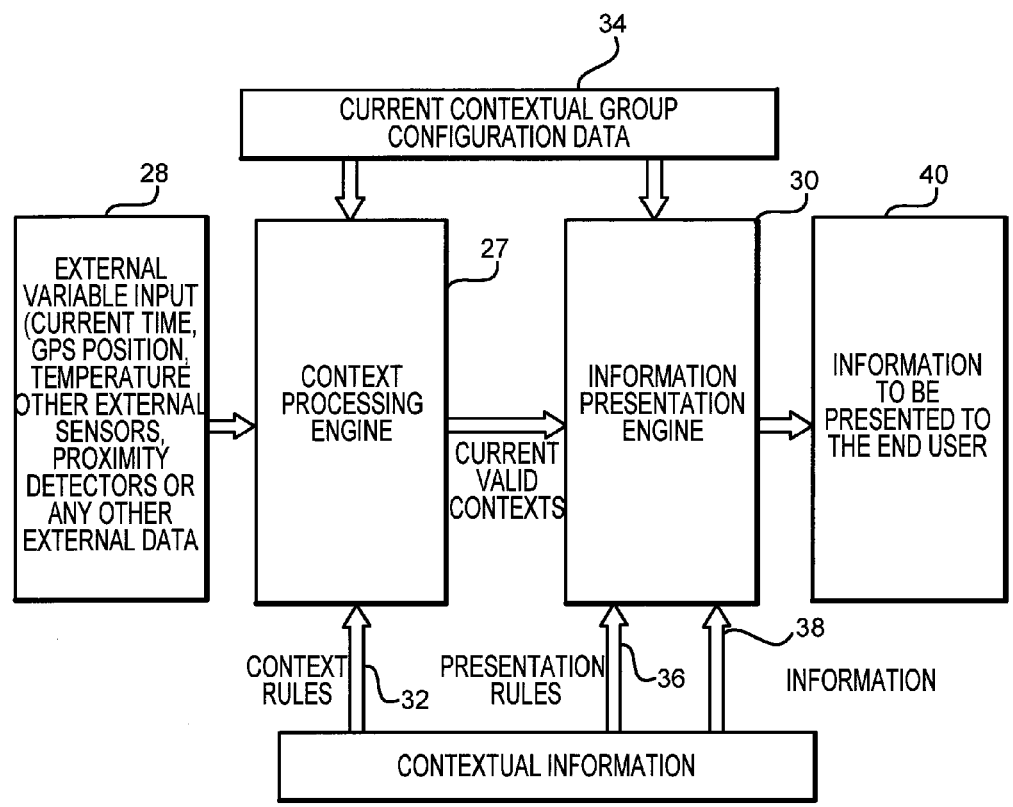
FIG. 4 is block diagram illustrating at least one embodiment of systems architecture for the context aware message presentation system.

As illustrated by cross-reference between FIGS. 3-4, a context aware message presentation system 10 is further illustrated. As shown in FIG. 3, and as defined in this document, the message context is defined by one or more sets of rules. As indicated, means are provided for changing the context management protocol and the context aware message received by the user of the mobile wireless communication instrument.

More specifically, the system for presenting context aware messages 10 includes a first set of rules adapted to define a variety of contexts expressing when and how the data will be useful to the user of a mobile Wireless communication instrument 12*a-n* or similar entity ("context rules"). The system for presenting a context aware message 10 also may include a second set of rules adapted to interpret the data within a defined context ("presentation rules").

In one aspect, as illustrated in FIGS. 3-4, the one or more sets of rules define how to interpret the same information in different ways depending on which rule is valid at the time the information is being interpreted. As one non-exclusive example, one such set of rules might define how to interpret information at various SPS position coordinates. The rules could provide that information is valid only if interpreted within certain SPS coordinates, or could provide that a message is to expire if not interpreted and/or received either within a certain time interval, or on the occurrence and/or non-occurrence of various combinations and iterations of position and time. As a person of ordinary skill in the art will appreciate, such rules also might include any other conditions other than position or time, including, for example, how frequently a message has been interpreted and/or read by the message recipient, or on a first acknowledgement by a recipient of receipt of the message, whether read or not.

As illustrated in FIG. 3, a plurality of context aware devices is shown and labeled for illustrative purposes a CAD 20*a-n*. Each of the CADs 20*a-n* includes a context management protocol 22*a-n* illustrated diagrammatically. As previously discussed and defined in this document, contextual information may include information that contains at least data to be presented to the recipient of a context aware message, and one or more sets of context rules that define the various valid contexts identified by a recipient of a context aware message as useful to the recipient. Contextual information may also include one or more sets of presentation rules corresponding to the one or more context rules that define how to interpret data, usually included originally in a global message, within a desired context.

A context aware device 20*a-n* may be either one or more mobile wireless communications instruments 12*a-n*, software applications, and/or one or more stand-alone devices, either or both of which is capable of sending and receiving contextual information; has the capability of interpreting the context rules contained within contextual information; has the logic and/or intelligence to know which contexts are valid at any given time; and/or has the capability of presenting desired information to a recipient of a context aware message in manner is dependent on interpreting the information context and determining the device's current valid context.

As also illustrated in FIG. 3, a contextual communication group includes a plurality of CADs 20*a-n* capable of exchanging contextual information created by any CAD 20*a-n* in the plurality of CADs 20*a-n*. For example, a contextual communication group may include either people who or objects that periodically receive data that updates conditions imposed on the receipt of context aware information created by other members of a contextual communication group.

A configuration manager 24 also is illustrated in FIG. 3. Unlike a central management entity, a feature not required in present context aware message presentation system 10, a configuration manager 24 is illustrated. A configuration manager 24 may be a CAD in a contextual communication group that stores special configuration information needed for a specific application. A configuration manager 24 also sends the configuration information to other members within the contextual communication group. Accordingly, configuration manager 24 may be either a dedicated CAD or a virtual device implemented by distributing functionalities of the configuration manager 24 to all CADs 20*a-n* in a contextual communication group. As also shown, a communication network 26 allows contextual information to be exchanged between two or more CADs 20*a-n*.

The context aware message presentation system 10 allows any member of a contextual communication group to define a contextual communication group, and to add or remove CADs 20*a-n* from a contextual communication group. The context aware message presentation system 10 also allows creation or modification of contextual information. The context aware message presentation system 10 also includes means for broadcasting and/or propagating contextual information, and changes to contextual information, within the contextual communication group.

As illustrated in FIG. 4, at least one embodiment of system architecture for the context aware message presentation system 10 is shown. As shown, the components include a context processing engine 27. The context processing engine 27 is capable of reading current external information 28, including, for example, SPS data, temperature, proximity, and similar parameters, and applies such external information to the context rules contained within the current contextual information being processed. Based on the results of the above computation, the context processing engine 27 is capable of outputting a set of all context rules that currently are valid to at least an information presentation engine 30.

The information presentation engine 30 is capable of reading current valid context rules 32, as well as the contextual communication group configuration data 34, and applies the context rules 32 and the contextual communication group configuration data 34 to the presentation rules 36 contained within the current contextual information 38 being processed. Based on the results of the above computation, the context aware message presentation system 10 outputs information in a format desired by a recipient of a context aware message 40.

As illustrated, the context aware message presentation system 10 offers several advantages over alternative systems associated or based on a central management entity. The context aware message presentation system 10 eliminates or simplifies designs contemplating use of a central management entity. Because the same body of the message is being exchanged, it can reduce messaging costs by employing broadcast communication strategy instead of point-to-point communication. The system also is easy to modify by modifying the context rules of the system.

Claim elements and steps in this document have been numbered solely as an aid in understanding the description. The numbering is not intended to, and should not be considered as intending to, indicate the ordering of elements and steps in the claims. In addition, the system for presenting context aware messages 10 shown in drawing FIGS. 1-4 shows at least one aspect of the system for presenting context aware messages 10, not intended to be exclusive, but merely illustrative of the disclosed embodiments. As a person skilled in the art will recognize, method steps may be interchanged sequentially without departing from the scope of the system for presenting context aware messages 10. Additionally, means-plus-function clauses in the claims are intended to cover the structures described as performing the recited function that include not only structural equivalents, but also equivalent structures.

What is claimed is:

1. A method of providing a context aware message, comprising:
generating, by a communication apparatus, a global message for transmission across a communication network for receipt by an other communication apparatus;
associating a context management protocol capable of transmission with the global message across the communication network, wherein the context management protocol is adapted to selectively modify the global message into one or more context aware messages based on a context of the other communication apparatus receiving the global message; and
transmitting the context management protocol and the global message.

2. The method of claim 1, wherein the context management protocol is capable of sorting information in the global message for presentation to a member of a contextual communication group.

3. The method of claim 1, wherein the context management protocol includes a first set of rules adapted to define a variety of contexts expressing when and how data of the global message will be useful to a user of the other communication apparatus.

4. The method of claim 1, wherein the context management protocol includes a second set of rules adapted to interpret data of the global message within a defined context.

5. The method of claim 2, wherein the contextual communication group is defined by one or more shared context parameters.

6. The method of claim 5, wherein the one or more shared context parameters may be changed by one or more members of the contextual communication group.

7. The method of claim 6, further comprising revising the one or more shared context parameters.

8. The method of claim 1, wherein the context management protocol is further configured for interpreting information included in the global message by applying a variety of rules included in the context management protocol.

9. The method of claim 8, wherein the context management protocol is further configured for allowing a member of a contextual communication group to revise the rules of the context management protocol.

10. The method of claim 9, wherein the context management protocol is further configured for revising the contextual communication group.

11. A communication apparatus for providing a context aware message, comprising:
means for generating a global message for transmission across a communication network for receipt by an other communication apparatus;
means for associating a context management protocol a context management protocol capable of transmission with the global message across the communication network, wherein the context management protocol is adapted to selectively modify the global message into one or more context aware messages based on a context of the other communication apparatus receiving the global message; and
means for transmitting the context management protocol and the global message.

12. The apparatus of claim 11, further comprising means for at least one of receiving, storing, executing, composing, and transmitting configuration information corresponding to one or more context management protocols.

13. The apparatus of claim 11, further comprising means for sorting information for presentation of a context aware message to one or more contextual communication groups.

14. The apparatus of claim 13, wherein the one or more contextual communication groups are defined by one or more shared context parameters.

15. The apparatus of claim 13, wherein the one or more shared context parameters may be changed by one or more members of the one or more contextual communication groups.

16. The apparatus of claim 11, wherein the context management protocol includes a plurality of rules for creating a context aware message from the global message.

17. The apparatus of claim 14, wherein the one or more shared context parameters may be selected from a group of shared context parameters associated with time, location, pressure, actions to be taken on receipt of a context aware message, and/or any other context parameter, either alone or in combination.

18. A communication apparatus for providing a context aware message, comprising:
   a memory storing a context management protocol;
   a processor in communication with the memory and configured to generate a global message for transmission across a communication network for receipt by an other communication apparatus;
   wherein the processor is further configured to associate the context management protocol with the global message, wherein the context management protocol is capable of transmission with the global message, and wherein the context management protocol is adapted to selectively modify the global message into one or more context aware messages based on a context of the other communication a apparatus receiving global message; and
   a transmitter to transmit the context management protocol and the global message.

19. The apparatus of claim 18, wherein the context management protocol includes a first set of rules adapted to define a variety of contexts expressing when and how data of the global message will be useful to a user of the other communication apparatus.

20. The apparatus of claim 18, wherein the context management protocol includes a second set of rules adapted to interpret data of the global message within a defined context.

21. The apparatus of claim 18, further comprising:
   a receiver to obtain a received global message with a received context management protocol, wherein the received global message is modifiable into a set of context aware messages, and wherein the received context management protocol includes a set of context rules and a set of presentation rules;
   a context processing engine in communication with a set of context information for the apparatus, wherein the context processing engine is executable to generate a set of current valid context rules by applying the set of context rules to the set of context information;
   an information presentation engine executable to generate a set of context-specific information for presentation as one of the set of context aware messages by applying the set of current valid context rules and the set of presentation rules to the global message.

22. The apparatus of claim 21, wherein the set of context rules and the set of presentation rules define a content and a context of the global message when received by the apparatus.

23. The apparatus of claim 21, wherein at least one of the context processing engine and the information presentation engine is further in communication with a set of current contextual group configuration data, and the information presentation engine is further executable to apply the set of current contextual group configuration data to generate the set of context-specific information for presentation as the one of the set of context aware messages.

24. The apparatus of claim 18, wherein the context management protocol is adapted to selectively modify the global message into one of a plurality of context aware messages each corresponding to one of a plurality of context information when received by the other communication apparatus having one of the plurality of context information.

25. A computer program product for providing a context aware message, comprising:
   a non-transitory computer-readable medium, comprising:
   at least one instruction for generating a global message for transmission across a communication network for receipt by a wireless communication instrument;
   at least one instruction for associating a context management protocol capable of transmission with the global message across the communication network, wherein the context management protocol is adapted to selectively modify the global message into one or more context aware messages based on a context of the other communication a apparatus receiving the global message; and
   at least one instruction for transmitting the context management protocol and the global message.

26. The computer program product of claim 25, wherein the context management protocol includes a first set of rules adapted to define a variety of contexts expressing when and how data of the global message will be useful to a user of the wireless communication instrument.

27. The computer program product of claim 25, wherein the context management protocol includes a second set of rules adapted to interpret data of the global message within a defined context.

28. The computer program product of claim 25, wherein the context management protocol is adapted to selectively modify the global message into one of a plurality of context aware messages each corresponding to one of a plurality of context information when received by the other communication apparatus having one of the plurality of context information.

29. The method of claim 1, wherein the context management protocol is adapted to selectively modify the global message into one of a plurality of context aware messages each corresponding to one of a plurality of context information when received by the other communication apparatus having one of the plurality of context information.

30. The method of claim 1, wherein transmitting further comprises broadcasting to two communication devices each having different context information such that the context management protocol applied to the global message results in different context aware messages in each of the two communication devices.

31. The apparatus of claim 11, wherein the context management protocol is adapted to selectively modify the global message into one of a plurality of context aware messages each corresponding to one of a plurality of context information when received by the other communication apparatus having one of the plurality of context information.

32. A method of presenting a message, comprising:
   receiving, at a communication device, a global message and a context management protocol, wherein the global message is modifiable by the context management protocol into a set of context aware messages based on a context of the communication device, and wherein the context management protocol includes a set of context rules and a set of presentation rules;
   generating a set of current valid context rules by applying the set of context rules to a set of context information;
   generating a set of context-specific information for presentation as one of the set of context aware messages by applying the set of current valid context rules and the set of presentation rules to the global message; and
   presenting the one of the set of context aware messages.

33. The method of claim 32, wherein the set of context rules and the set of presentation rules define a content and a context of the global message when received by the apparatus.

34. The method of claim 32, further comprising receiving a set of current contextual group configuration data, and applying the set of current contextual group configuration data to further generate the set of context-specific information for presentation as the one of the set of context aware messages.

35. A communication apparatus for presenting a message, comprising:
- means for receiving a global message and a context management protocol, wherein the global message is modifiable by the context management protocol into a set of context aware messages based on a context of the communication apparatus, and wherein the context management protocol includes a set of context rules and a set of presentation rules;
- means for generating a set of current valid context rules by applying the set of context rules to the set of context information;
- means for generating a set of context-specific information for presentation as one of the set of context aware messages by applying the set of current valid context rules and the set of presentation rules to the global message; and
- means for presenting the one of the set of context aware messages.

36. A computer program product for presenting a message, comprising:
- a non-transitory computer-readable medium, comprising:
- at least one instruction for receiving, at a communication device, a global message and a context management protocol, wherein the global message is modifiable by the context management protocol into a set of context aware messages based on a context of the communication device, and wherein the context management protocol includes a set of context rules and a set of presentation rules;
- at least one instruction for generating a set of current valid context rules by applying the set of context rules to the set of context information;
- at least one instruction for generating a set of context-specific information for presentation as one of the set of context aware messages by applying the set of current valid context rules and the set of presentation rules to the global message; and
- at least one instruction for presenting the one of the set of context aware messages.

37. A communication apparatus for presenting a message, comprising:
- a receiver to obtain a received global message with a received context management protocol, wherein the received global message is modifiable by the context management protocol into a set of context aware messages based on a context of the communication apparatus, and wherein the received context management protocol includes a set of context rules and a set of presentation rules;
- a context processing engine in communication with a set of context information for the apparatus, wherein the context processing engine is executable to generate a set of current valid context rules by applying the set of context rules to the set of context information;
- an information presentation engine executable to generate a set of context-specific information for presentation as one of the set of context aware messages by applying the set of current valid context rules and the set of presentation rules to the global message.

38. The apparatus of claim 37, wherein the set of context rules and the set of presentation rules define a content and a context of the global message when received by the apparatus.

39. The apparatus of claim 37, wherein at least one of the context processing engine and the information presentation engine is further in communication with a set of current contextual group configuration data, and the information presentation engine is further executable to apply the set of current contextual group configuration data to generate the set of context-specific information for presentation as the one of the set of context aware messages.

* * * * *